Figure 7:
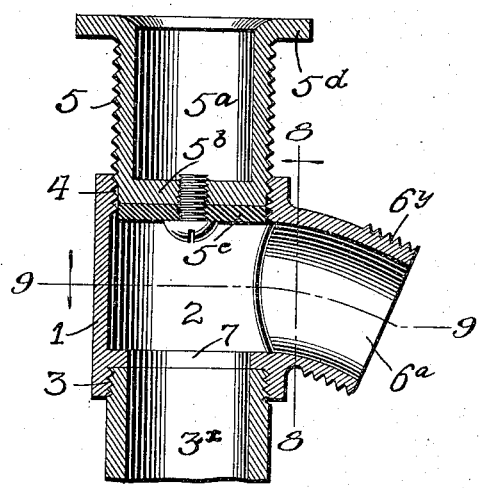

C. P. ANDERSON.
VALVE.
APPLICATION FILED OCT. 13, 1914.
1,171,080.
Patented Feb. 8, 1916.
2 SHEETS—SHEET 1.
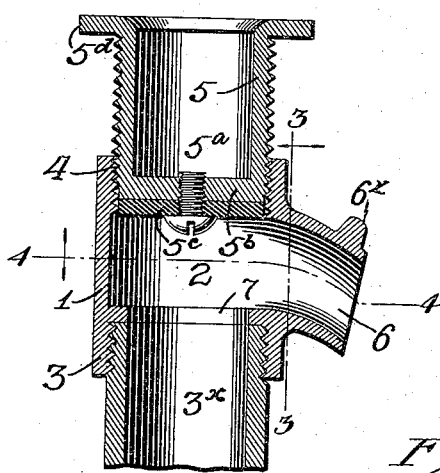
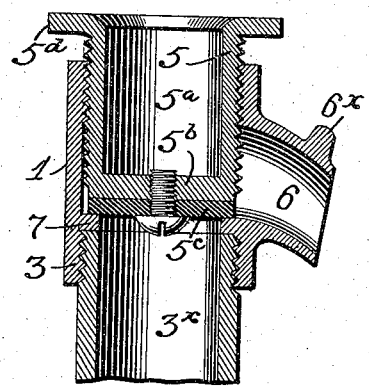
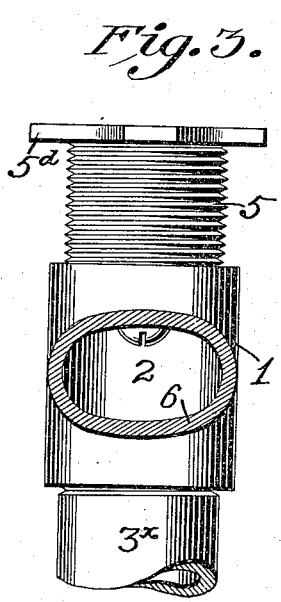
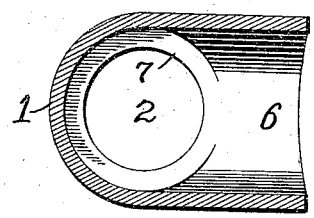
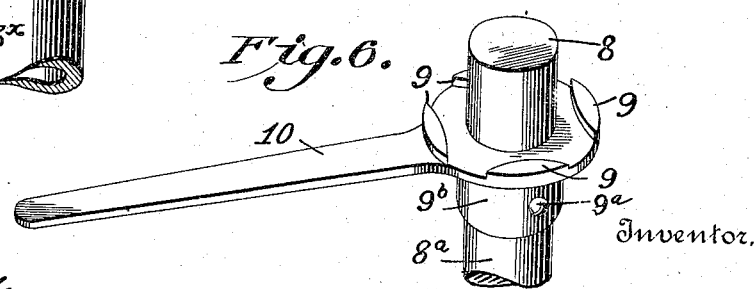

C. P. ANDERSON.
VALVE.
APPLICATION FILED OCT. 13, 1914.

1,171,080.

Patented Feb. 8, 1916.
2 SHEETS—SHEET 2.

Witnesses
W. H. Rockwell
J. T. Stanley.

Inventor
Charles P. Anderson,

By Knight Bros
Attorneys

UNITED STATES PATENT OFFICE.

CHARLES P. ANDERSON, OF SEATTLE, WASHINGTON.

VALVE.

1,171,080.  Specification of Letters Patent.  Patented Feb. 8, 1916.

Application filed October 13, 1914. Serial No. 866,458.

*To all whom it may concern:*

Be it known that I, CHARLES P. ANDERSON, a citizen of the United States, residing at Seattle, in the county of King and State of Washington, have invented certain new and useful Improvements in Valves, of which the following is a specification.

This invention relates to valves for controlling the flow of a fluid through a pipe, and particularly to valves for controlling the distribution of water through irrigation pipes, in which sediment, grass, roots, and other debris are frequently encountered, particularly where the so-called riser or outlet is tapped into the main pipe and upon the upper end of which the controlling valve, such as that herein described, is usually located.

The invention has for its object to provide a valve of very simple and cheap construction which will afford as free and unobstructed passage for the fluid through the valve as is afforded by the pipe to which the valve is attached and at the same time will admit of ready removal of the valve plug and afford free and unobstructed access to the pipe for dislodgment of accumulation therein when the plug is removed. To these ends, the improved valve embodies as essential structural characteristics, a substantially cylindrical shell open without material restriction in transverse dimension from end to end and providing, in axial alinement through said shell, internally-threaded end openings with an intermediate valve chamber in communication therewith, and with a discharge spout extending laterally from the valve chamber; one of the end openings being adapted to receive the end of the pipe to be controlled, and the other having fitted therein an axially adjustable valve plug; and an internal flange being provided between the valve chamber and the pipe-receiving opening, which has an opening corresponding substantially to the bore of the pipe and provides a pipe-seating abutment by its under face and a valve seat by its upper face; this seating flange forming the floor of the valve chamber and being preferably in the plane of the bottom of the spout, while the inner end of the valve plug constitutes the entire top wall of the valve chamber, and preferably assuming a position in the plane of the top of
the spout when fully open.

A further novel characteristic resides in the construction of the valve plug as a deep cylindrical shell with an external gripping flange, whereby it affords a reduced inner end for convenient attachment of a packing washer; a bore to receive and guide the shank or stock of a tool employed for adjusting it, and suitable indentations or faces to receive the gripping portion of such tool, or for prehension if manipulated by more direct application of the hand.

It is to be understood that the invention is not limited to a device in which all of these novel features exist simultaneously, but in such combinations of these features as are hereinafter pointed out in the claims.

Several embodiments of the invention, as well as a tool especially designed to enter into combination with the valve, are disclosed in the accompanying drawings, in which—

Figure 8:
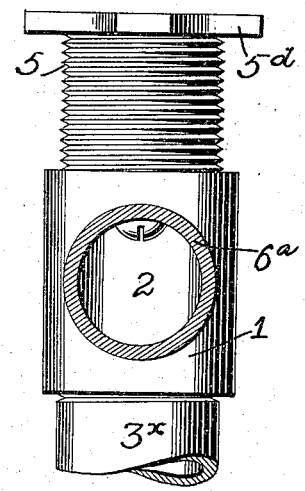
Figure 9:
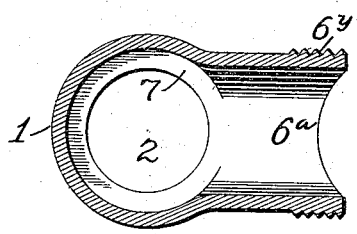
Figure 10:
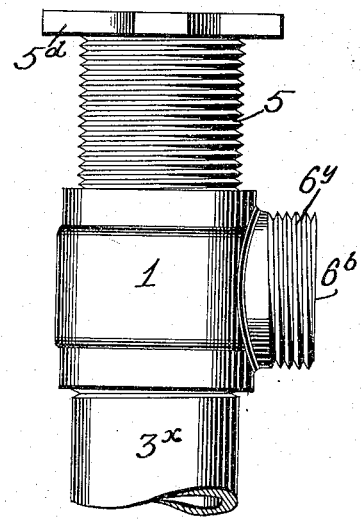

Figures 1 to 5 illustrate one embodiment of the several features of the invention; Fig. 1 and 2 being axial sections in a plane through the spout showing the valve open and closed, respectively; Fig. 3 a section on the line 3—3, Fig. 1; Fig. 4 a section on the line 4—4, Fig. 1, and Fig. 5 a top plan view of the valve. Fig. 6 is a perspective view of the valve-operating key or tool designed to enter into combination with the particular construction of valve which I prefer to employ. Figs. 7 to 10 are views illustrating valves with modified constructions of discharge spout; Fig. 7 being an axial section in the plane of the spout; Fig. 8 a section on the line 8—8, Fig. 7; Fig. 9 a section on the line 9—9, Fig. 7, showing one design of discharge spout, and Fig. 10 being a side elevation of a valve having another design of discharge spout.

In all of the forms, 1 represents the valve shell constructed with the intermediate valve chamber 2, and having in axial alinement with said valve chamber, the internally-threaded pipe opening 3 to receive the pipe 3ˣ at one end and the internally-threaded valve opening 4 to receive the valve plug 5 at the other end. The shell is further constructed with a discharge spout leading laterally from the valve chamber 2 and preferably having a capacity equal at least to that of the pipe to be controlled. This discharge spout is represented at 6 in Figs. 1 to 4, where it consists of an oblate bib, whose horizontal dimension is substantially the same as the diameter of the valve chamber, thereby avoiding stricture against the escape of debris from the valve chamber, and with a lug 6$^x$ upon which to hang a distributing trough for irrigation purposes. The spout is represented at 6$^a$ in Figs. 7 to 9, where it comprises a bib of circular section having external threads 6$^y$ for attachment of a distributing connection, while in Fig. 10, it is shown as a straight threaded nipple 6$^b$ with the external thread 6$^y$.

An internal flange 7 is provided in the shell, which constitutes the floor of the valve chamber and provides a seat for the valve plug 5 and an abutment for the pipe 3$^x$. The opening of this flange preferably corresponds with the bore of the pipe in order to avoid any shoulders, obstructions, or strictures between the pipe and the valve that would obstruct the free passage of debris that may enter the pipe, and also to give free access to the pipe from the upper end of the shell when the valve plug 5 is removed.

The valve plug is in the form of a hollow shell to provide a central socket 5$^a$ to receive the stock or shank of a tool or wrench and also to provide a thin bottom wall 5$^b$ upon which to mount the packing washer 5$^c$. At top, the valve plug is surrounded by a gripping flange 5$^d$ which is preferably formed with reëntrant faces, such as shown in Fig. 5, to afford a griphold in manipulating the valve plug.

In order to adjust the valve plug, it may simply be necessary to grasp the flange with the hand; or if necessary to use a tool, the plug is peculiarly adapted to receive a device such as shown in Fig. 6, wherein 8 represents a stock or shank adapted to enter the socket 5$^a$, while 9 are lugs conforming to the reëntrant faces of the valve plug flange and 10 is a lever through which the valve when thus engaged may be turned in either direction. The shank 8 may be conveniently made of a wooden cylinder secured in position by a pin 9$^a$ passing through the flange 9$^b$ of the tool head, and it is preferably extended beyond the tool head as at 8$^a$ a distance which will adapt it to serve as a shaft in reaching the valve plug from a standing posture even though the valve may be located quite close to the ground.

From the foregoing description, it will be obvious that the improved valve is well adapted for application to irrigation pipes or other uses where foreign matter is encountered in the water or fluid to be distributed; that it is adapted to control the flow of fluid through such a pipe without offering any obstruction to the escape of debris or foreign matter or accumulating the same within the valve chamber; that the valve plug is readily removable and when removed opens up the valve shell to the full diameter of the pipe and affords access of a cleaning tool to the latter, and that withal the device is exceedingly simple and cheap in construction, readily applied and convenient and effective in use.

I claim:—

1. A valve for controlling flow through a pipe, said valve comprising a substantially cylindrical shell having a pipe opening at one end, a valve chamber in its intermediate portion and a valve plug opening at its other end; said pipe opening, valve plug opening and valve chamber being coaxially alined; a discharge spout communicating laterally with the valve chamber and a valve plug threaded in the valve plug opening and axially disposed therein; said valve plug comprising a cylindrical shell having a central socket and a surrounding gripping flange, the threaded portion of the valve plug opening terminating at the free end of said shell permitting removal, without hindrance of the plug.

2. A valve for controlling flow through a pipe; said valve comprising a substantially cylindrical shell having a pipe opening at one end, a smooth bored valve chamber in its intermediate portion and a valve plug opening at its other end; said pipe opening, valve plug opening, and valve chamber being coaxially alined and their respective diameters of increasing magnitude in the order here enumerated; a discharge spout communicating laterally with the valve chamber and level with said pipe opening; and a valve plug threaded in the valve plug opening and axially adjustable therein; said valve plug comprising a cylindrical shell having a central socket and a surrounding gripping flange, the threaded portion of the valve plug opening terminating at the free end of said shell permitting removal without hindrance to the plug.

3. A valve for controlling flow through a pipe; said valve comprising a shell having a pipe opening, a suitably vented smooth bored valve chamber and a valve plug opening of smaller diameter than said chamber; in combination with a valve plug threaded in the valve plug opening and constructed with a central socket and a surrounding gripping flange, and a removable operating handle for said valve plug comprising a central shank adapted to enter the valve plug socket and centering in the plug, and circumferentially disposed gripping lugs adapted to engage the gripping flange of said plug, whereby the plug may be detached from the shell by simply unscrewing it.

The foregoing specification signed at Seattle, Washington, this 22d day of September, 1914.

CHARLES P. ANDERSON.

In presence of—
L. HOWARD SMITH,
CHAS. W. RICHARD.